United States Patent
Choi et al.

(10) Patent No.: US 10,955,282 B2
(45) Date of Patent: Mar. 23, 2021

(54) PRESSURE DETECTING SENSOR

(71) Applicant: LG INNOTEK CO., LTD., Seoul (KR)

(72) Inventors: Man Hue Choi, Seoul (KR); Bi Yi Kim, Seoul (KR); Ji Hye Kim, Seoul (KR); Yong Hwa Park, Seoul (KR); Hyun Gyu Park, Seoul (KR); Hyung Yoon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 250 days.

(21) Appl. No.: 16/095,428

(22) PCT Filed: Apr. 20, 2017

(86) PCT No.: PCT/KR2017/004235
§ 371 (c)(1),
(2) Date: Oct. 22, 2018

(87) PCT Pub. No.: WO2017/183922
PCT Pub. Date: Oct. 26, 2017

(65) Prior Publication Data
US 2019/0137322 A1    May 9, 2019

(30) Foreign Application Priority Data

Apr. 22, 2016 (KR) .......................... 10-2016-0049328
Apr. 22, 2016 (KR) .......................... 10-2016-0049329

(51) Int. Cl.
*G01G 7/06* (2006.01)
*G01G 19/413* (2006.01)
(Continued)

(52) U.S. Cl.
CPC ................. *G01G 3/13* (2013.01); *G01G 7/06* (2013.01); *G01G 19/413* (2013.01); *G01G 19/44* (2013.01); *G01L 9/08* (2013.01); *G01L 9/12* (2013.01)

(58) Field of Classification Search
CPC ......... G01L 1/142; G01L 1/144; G01L 1/146; G01L 9/08; G01L 9/912; G01L 9/12;
(Continued)

(56) References Cited

U.S. PATENT DOCUMENTS 3,875,481 A * 4/1975 Miller ...................... G01G 3/00
361/283.1
3,895,421 A * 7/1975 Miller ...................... G01G 7/06
29/25.42
(Continued)

FOREIGN PATENT DOCUMENTS

JP        2005-265422      9/2005
KR    10-2008-0114724    12/2008
(Continued)

*Primary Examiner* — Randy W Gibson
(74) *Attorney, Agent, or Firm* — KED & Associates LLP

(57) ABSTRACT

A pressure detecting sensor according to an embodiment of the present invention comprises: a first electrode layer including a plurality of signal electrodes arranged in a first region and a plurality of wiring electrodes arranged in a second region and connected to the plurality of signal electrodes, the first electrode layer being made of a conductive fiber; an elastic dielectric layer arranged in the first region; and a second electrode layer arranged in the elastic dielectric layer, the second electrode layer being made of a conductive fiber.

14 Claims, 8 Drawing Sheets

(51) Int. Cl.
*G01G 19/44* (2006.01)
*G01L 9/12* (2006.01)
*G01G 3/13* (2006.01)
*G01L 9/08* (2006.01)

(58) Field of Classification Search
CPC .......... G01G 3/13; G01G 7/06; G01G 19/413; G01G 19/44
See application file for complete search history.

(56) References Cited

U.S. PATENT DOCUMENTS

| | | | | |
|---|---|---|---|---|
| 5,878,620 | A * | 3/1999 | Gilbert | B60N 2/002 180/273 |
| 7,153,383 | B2 * | 12/2006 | Gebert | G01G 7/06 156/249 |
| 7,176,390 | B2 * | 2/2007 | Hansen | G01G 7/06 177/136 |
| 7,217,891 | B2 * | 5/2007 | Fischer | B60N 2/002 177/144 |
| 7,395,717 | B2 * | 7/2008 | DeAngelis | G01L 1/146 73/724 |
| 8,528,411 | B2 * | 9/2013 | Matsumoto | C08G 18/12 73/715 |
| 10,876,907 | B2 * | 12/2020 | Yoon | G01L 1/14 |
| 2007/0248799 | A1 | 10/2007 | DeAngelis et al. | |
| 2013/0047747 | A1 | 2/2013 | Joung | |
| 2015/0324047 | A1 | 11/2015 | Kim et al. | |
| 2015/0370356 | A1 | 12/2015 | Hwang et al. | |
| 2018/0149685 | A1 * | 5/2018 | Nakashima | G01R 1/06794 |

FOREIGN PATENT DOCUMENTS

| | | |
|---|---|---|
| KR | 10-2013-0022544 | 3/2013 |
| KR | 10-2015-0134656 | 12/2015 |
| KR | 10-2016-0000100 | 1/2016 |

* cited by examiner

PRESSURE DETECTING SENSOR

CROSS-REFERENCE TO RELATED PATENT APPLICATIONS

This application is a U.S. National Stage Application under 35 U.S.C. § 371 of PCT Application No. PCT/KR2017/004235, filed Apr. 20, 2017, which claims priority to Korean Patent Application No. 10-2016-0049328, filed Apr. 22, 2016, and Korean Patent Application No. 10-2016-0049329, filed Apr. 22, 2016 whose entire disclosures are hereby incorporated by reference.

TECHNICAL FIELD

The present invention relates to a pressure detecting sensor and a pressure detecting device including the same.

BACKGROUND ART

Recently, due to development of electronic technologies and information and communication technologies, the field of health care has been rapidly developed. That is, a health care system capable of measuring conditions of a human body by using biometric information has been required, and more particularly, a technology of obtaining biometric information by using a chair generally used in a daily life has been developed. For example, a technology of mounting a sensor, which detects a pressure, in a chair so as to check a weight, age group, posture, and the like of one who is seated has been required.

A general pressure detecting sensor may have a structure in which a lower electrode, an elastic dielectric layer, and an upper electrode are sequentially stacked. In such a pressure detecting sensor, a thickness of the elastic dielectric layer changes according to a variation of a pressure applied to the upper electrode, capacitance varies according to the variation in the thickness of the elastic dielectric layer, and the pressure applied to the upper electrode is calculated according to the variation of the capacitance.

However, while a human body touches the pressure detecting sensor, when the pressure detecting sensor shakes or an electromagnetic field is formed around the pressure detecting sensor, capacitance of the pressure detecting sensor changes even though a pressure is not substantially applied. As described above, shakes, electromagnetic waves, or touches of a human body may function as noise of the pressure detecting sensor.

DISCLOSURE OF INVENTION

Technical Problem

The present invention is directed to providing a pressure detecting sensor which detects a pressure according to a weight applied thereto.

Technical Solution

One aspect of the present invention provides a pressure detecting sensor including a first electrode layer which is formed of conductive fibers and includes a plurality of signal electrodes arranged in a first region and a plurality of wiring electrodes arranged in a second region and connected to the plurality of signal electrodes, an elastic dielectric layer disposed in the first region, and a second electrode layer disposed on the elastic dielectric layer and formed of conductive fibers.

The pressure detecting sensor may further include a supporting material disposed in the second region.

The supporting material may be disposed on a side surface of the elastic dielectric layer above the plurality of wiring electrodes, and hardness of the supporting material may be greater than hardness of the elastic dielectric layer.

The plurality of wiring electrodes may be embedded in the supporting material.

The plurality of signal electrodes and the plurality of wiring electrodes may be bent from each other.

The pressure detecting sensor may further include an insulating layer disposed below the first electrode layer.

The second electrode layer may be connected to a ground.

Patterns matched with an alignment of the plurality of signal electrodes may be formed on the second electrode layer.

The second electrode layer may be formed to be not separated by the patterns.

Another aspect of the present invention provides a pressure detecting device including a pressure detecting sensor, a signal processing portion connected to the pressure detecting sensor and configured to process an electrical signal generated by the pressure detecting sensor, and a control portion connected to the signal processing portion and configured to generate a control signal on the basis of the signal processed by the signal processing portion. Here, the pressure detecting sensor includes a first electrode layer which is formed of conductive fibers and includes a plurality of signal electrodes arranged in a first region and a plurality of wiring electrodes arranged in a second region and connected to the plurality of signal electrodes, an elastic dielectric layer disposed in the first region, and a second electrode layer disposed on the elastic dielectric layer and formed of conductive fibers.

Still another aspect of the present invention provides a pressure detecting sensor including a first electrode layer formed of conductive fibers, an elastic dielectric layer disposed on the first electrode layer, a second electrode layer disposed on the elastic dielectric layer and formed of conductive fibers, and a signal transmission portion connected to the first electrode layer and the second electrode layer. Here, the signal transmission portion includes a first metal electrode connected to the first electrode layer, a second metal electrode connected to the second electrode layer, and an insulating layer disposed between the first metal electrode and the second metal electrode. At least one of the first metal electrode and the second metal electrode has a mesh structure.

The first electrode layer may include a plurality of signal electrodes spaced at certain intervals apart, and the second electrode layer may be connected to a ground.

The second metal electrode may have a mesh structure.

The second metal electrode may include copper.

The signal transmission portion may include a flexible printed circuit board (FPCB).

The mesh structure may be formed overall on one of both surfaces of the FPCB.

The pressure detecting sensor may further include an insulating layer disposed below the first electrode layer.

Patterns matched with an alignment of the plurality of signal electrodes may be formed on the second electrode layer.

The second electrode layer may be formed to be not separated by the patterns.

Yet another aspect of the present invention provides a pressure detecting device including a pressure detecting sensor, a signal processing portion connected to the pressure detecting sensor and configured to process an electrical signal generated by the pressure detecting sensor, and a control portion connected to the signal processing portion and configured to generate a control signal on the basis of the signal processed by the signal processing portion. Here, the pressure detecting sensor includes a first electrode layer formed of conductive fibers, an elastic dielectric layer disposed on the first electrode layer, a second electrode layer disposed on the elastic dielectric layer and formed of conductive fibers, and a signal transmission portion connected to the first electrode layer and the second electrode layer. The signal transmission portion includes a first metal electrode connected to the first electrode layer, a second metal electrode connected to the second electrode layer, and an insulating layer disposed between the first metal electrode and the second metal electrode. At least one of the first metal electrode and the second metal electrode has a mesh structure.

Advantageous Effects

A pressure detecting sensor according to one embodiment of the present invention may precisely detect a pressure according to an applied weight and may accurately detect a pressure distribution.

Particularly, a pressure detecting sensor according to one embodiment of the present invention may prevent noise caused by shakes of the pressure detecting sensor, noise caused by electromagnetic waves formed around the pressure detecting sensor, noise caused by touches of a human body, or noise caused by a pressure applied to a wiring electrode.

Also, according to one embodiment of the present invention, since detection is performed by a unit of surface instead of a particular point, it is advantageous to determine a posture.

Also, a pressure detecting sensor according to one embodiment of the present invention may have a large area such that a user does not feel any difference. Also, a pressure detecting sensor according to one embodiment of the present invention is simply modularized while having high resolution.

MODE FOR INVENTION

Figure 1:
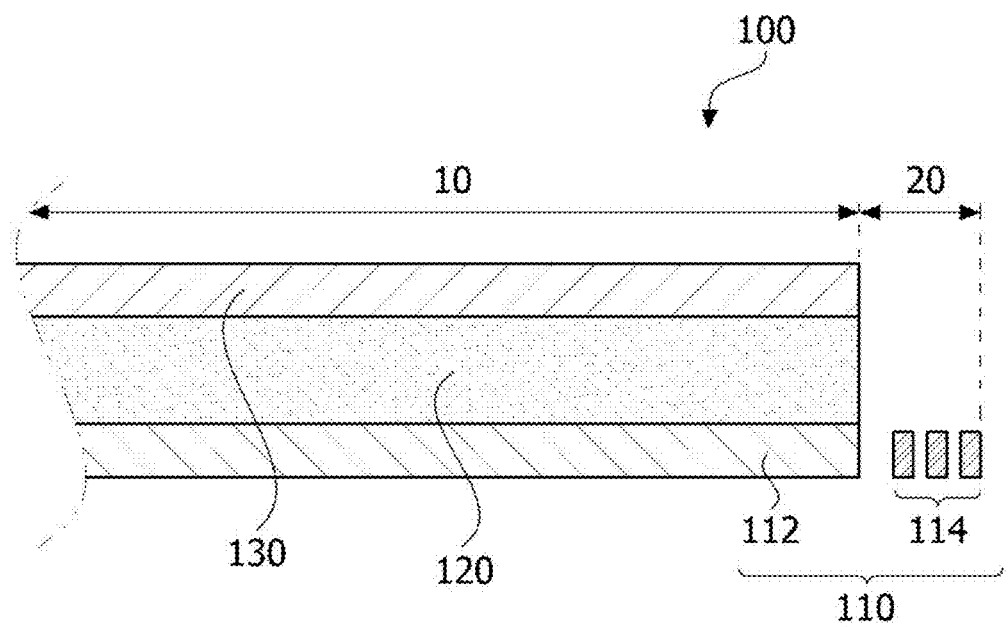
FIG. 1 is a cross-sectional view of a pressure detecting sensor according to one embodiment of the present invention.

Since a variety of modifications and several embodiments of the present invention may be made, exemplary embodiments will be illustrated in the drawings and will be described in detail. However, it should be understood that the present invention is not limited to the exemplary embodiments and includes all changes and equivalents or substitutes included in the concept and technical scope of the present invention.

The terms including ordinal numbers such as "second," "first," and the like may be used for describing a variety of components. However, the components are not limited by the terms. The terms are used only for distinguishing one component from another component. For example, without departing from the scope of the present invention, a second component may be referred to as a first component, and similarly, a first component may be referred to as a second component. The term "and/or" includes any and all combinations of one or a plurality of associated listed items.

When it is described that one component is "connected" or "joined" to another component, it should be understood that the one component may be directly connected or joined to the other component but another component may be present therebetween. On the other hand, when it is described that one component is "directly connected" or "directly joined" to another component, it should be understood that no other component is present therebetween.

Terms used herein are used merely for describing exemplary embodiments and are not intended to limit the present invention. Singular expressions, unless clearly defined otherwise in context, include plural expressions. Throughout the application, it should be understood that the terms "comprise," "have," and the like are used herein to specify the presence of stated features, numbers, steps, operations, elements, components or combinations thereof but do not preclude the presence or addition of one or more other features, numbers, steps, operations, elements, components, or combinations thereof.

Unless defined otherwise, the terms used herein including technical or scientific terms have the same meanings as those which are generally understood by one of ordinary skill in the art. Terms such as those defined in commonly used dictionaries should be construed as having meanings equal to contextual meanings of a related art and should not be interpreted in an idealized or excessively formal sense unless defined otherwise herein.

Hereinafter, embodiments will be described in detail with reference to the attached drawings. Regardless of drawing's signs, equal or corresponding elements will be referred to as like reference numerals and an overlapped description thereof will be omitted.

Figure 2:
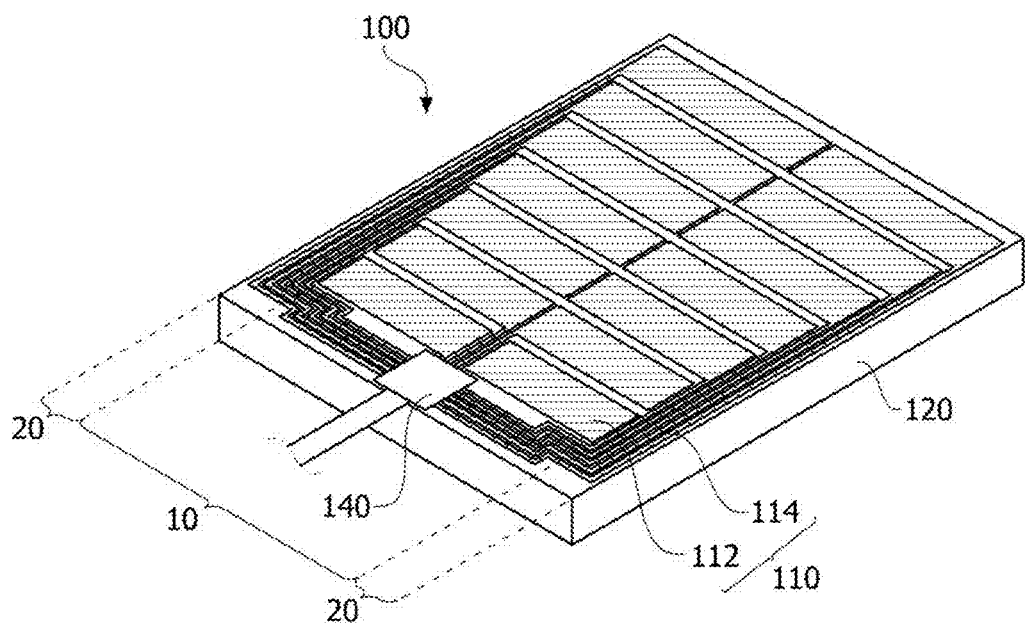
FIG. 2 is a bottom view of the pressure detecting sensor according to one embodiment of the present invention.
Figure 3:
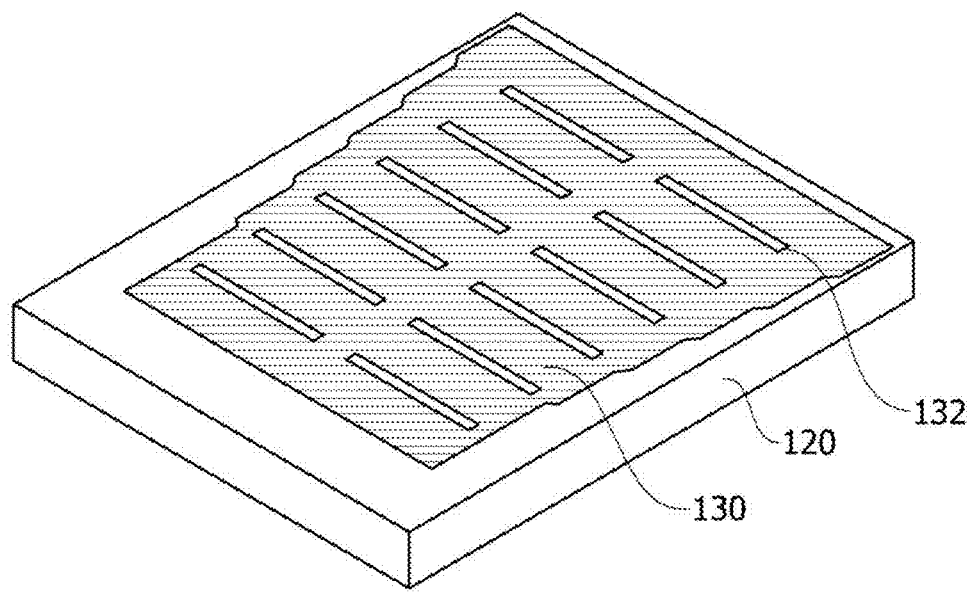
FIG. 3 is a top view of the pressure detecting sensor according to one embodiment of the present invention.

FIG. 1 is a cross-sectional view of a pressure detecting sensor according to one embodiment of the present invention, FIG. 2 is a bottom view of the pressure detecting sensor according to one embodiment of the present invention, and FIG. 3 is a top view of the pressure detecting sensor according to one embodiment of the present invention.

Referring to FIGS. 1 to 3, a pressure detecting sensor 100 includes a first electrode layer 110, an elastic dielectric layer 120 disposed on the first electrode layer 110, a second electrode layer 130 disposed on the elastic dielectric layer 120, and a signal transmission portion 140.

Here, the first electrode layer 110 includes a plurality of signal electrodes 112 arranged in a first region 10 and includes a plurality of wiring electrodes 114 arranged in a second region 20 and connected to the plurality of signal electrodes 112. Also, the elastic dielectric layer 120 and the second electrode layer 130 are arranged on the first region 10, that is, on the signal electrodes 112 of the first electrode layer 110. Here, since a region for detecting a pressure is a region where the plurality of signal electrodes 112 are arranged, that is, the first region 10, the first region 10 may be interchangeably used with a sensing region and the second region 20 may be used while being mixed with a non-sensing region.

Here, each of the wiring electrodes 114 may be connected to a signal electrode of a signal processing portion (not shown) through a copper wire of the signal transmission portion 140, and a wire withdrawn from the second electrode layer 130 may be connected to a ground electrode of the signal processing portion through a ground of the signal transmission portion 140. An object whose pressure is detected, for example, a human body may be set to be disposed on the second electrode layer 130. Here, the signal transmission portion 140 may be a rigid printed circuit board (PCB) or a flexible PCB. In the specification, the signal transmission portion 140 may be interchangeably used with a PCB. Here, the signal transmission portion 140 may extend from a surface on which the first electrode layer 110 is disposed, and the wire withdrawn from the second electrode layer 130 may pass through the elastic dielectric layer 120 and be connected to the ground of the signal transmission portion 140. Alternatively, the signal transmission portion 140 may extend from a surface on which the second electrode layer 130 is disposed, and the plurality of wiring electrodes 114 of the first electrode layer 110 may pass through the elastic dielectric layer 120 and be connected to the copper wire of the signal transmission portion 140. Otherwise, the signal transmission portion 140 may be disposed on a side surface of the elastic dielectric layer 120, the plurality of wiring electrodes 114 of the first electrode layer 110 may be connected to the copper wire of one surface of the signal transmission portion 140, and the wire withdrawn from the second electrode layer 130 may be connected to the ground of the other surface of the signal transmission portion 140.

As described above, when the second electrode layer 130 is connected to the ground, although a human body comes into slight contact with the second electrode layer 130, a pressure is not actually applied to the second electrode layer 130 such that capacitance between the first electrode layer 110 and the second electrode layer 130 does not change. Accordingly, it is possible to prevent noise caused by a touch of the human body.

Meanwhile, the first electrode layer 110 and the second electrode layer 130 are formed of conductive fibers. For example, the first electrode layer 110 and the second electrode layer 130 may be formed of conductive fabric woven using conductive fibers.

The conductive fiber may be a metal wire or a general fiber coated with a metal film on a surface thereof. The conductive fiber may be a general fiber on which metal particles are scattered. When the conductive fiber is a metal wire, a diameter of the metal wire may be 10 µm to 100 µm. When the diameter of the metal wire is less than 10 µm, since strength of the metal wire is too low, it is difficult to process the wire as fabric. When the diameter of the metal wire is more than 100 µm, since strength of the metal wire is too high, flexibility of fabric may decrease such that fabric processing facilities may be damaged during processing and a user may easily feel differences. Here, the metal wire may be Cu, Ni, or a stainless alloy. The stainless alloy may be, for example, a martensite-based stainless alloy, a ferrite-based stainless alloy, an austenite-based stainless alloy, a diphase stainless alloy, a precipitation-hardened stainless alloy, or the like. When the metal wire is a stainless alloy, an anticorrosion property of the pressure detecting sensor 100 may increase.

When the conductive fiber is a general fiber coated with a metal film on a surface thereof, the metal film may be formed using a method of coating the surface of the general fiber with metal particles through plating or deposition. Here, the metal particles may be a Cu, Ni, or stainless alloy, and a thickness of the metal film may be 1 µm to 50 µm. When the thickness of the metal film is less than 1 µm, since conductivity is low, a loss may occur during signal transmission. When the thickness of the metal film is more than 50 µm, the metal film may easily fall off from the surface of the fiber.

Also, the elastic dielectric layer 120 is a dielectric body of a material having restoring force which is elastically deformed when a pressure is applied from the outside and returns to an original shape when the pressure is released. The elastic dielectric layer 120 may include, for example, a fiber material having a random fiber arrangement such as foam, non-woven fabric, a nanoweb, and the like, a synthetic fiber including one selected from the group consisting of polyurethane, nylon, polyethylene terephthalate, and polyester, a natural fiber, an elastomer, a rubber, urethane, or the like. Here, a thickness of the elastic dielectric layer 120 may be 50 µm to 300 µm.

As described above, while the elastic dielectric layer 120 is disposed between the first electrode layer 110 and the second electrode layer 130, when a pressure is applied to the second electrode layer 130, a thickness d of the elastic dielectric layer 120 decreases and the capacitance between the first electrode layer 120 and the second electrode layer 130 changes. The pressure detecting sensor 100 according to one embodiment of the present invention and a pressure detecting device including the same may detect a pressure applied to the second electrode layer 130 on the basis of a variation of the capacitance.

Particularly, according to the embodiment of the present invention, when the elastic dielectric layer 120 and the second electrode layer 130 are arranged on the signal electrodes 112 of the first electrode layer 110 and at least one of the elastic dielectric layer 120 and the second electrode layer 130 does not overlap with the wiring electrodes 114 of the first electrode layer 110, only a pressure applied to the region in which the signal electrodes 112 are arranged, that is, the first region 10 may be detected and a pressure applied to the region in which the wiring electrodes 114 are arranged, that is, the second region 20 may not be detected. Accordingly, since the capacitance does not change even when a pressure is applied to the wiring electrodes 114 which are the non-sensing region 20, it is possible to reduce noise caused by the wiring electrodes 114.

Meanwhile, according to the embodiment of the present invention, the plurality of signal electrodes 112 are spaced at certain intervals apart and each of the signal electrodes may be connected to each of the wiring electrodes. Accordingly, a variation of the capacitance may be obtained for each signal electrode and a distribution of the variation of the capacitance on the pressure detecting sensor 100 may be obtained. That is, each signal electrode may function as one sensing point.

Also, according to the embodiment of the present invention, the second electrode layer 130 is totally connected while patterns 132 matched with an alignment of the plurality of signal electrodes 112 of the first electrode layer 110 may be formed on the second electrode layer 130. Here, the second electrode layer 130 is not separated into a plurality of sections by the patterns 122. Due to the patterns 132 formed at the second electrode layer 130, an empty space may be formed at a part of the second electrode layer 130 or the empty space may be filled with an insulating material. As described above, when the patterns of the second electrode layer 130 are matched with the alignment of the plurality of signal electrodes 112 of the first electrode layer 110, sensitivity of detecting a pressure may be improved for each signal electrode.

Figure 4:
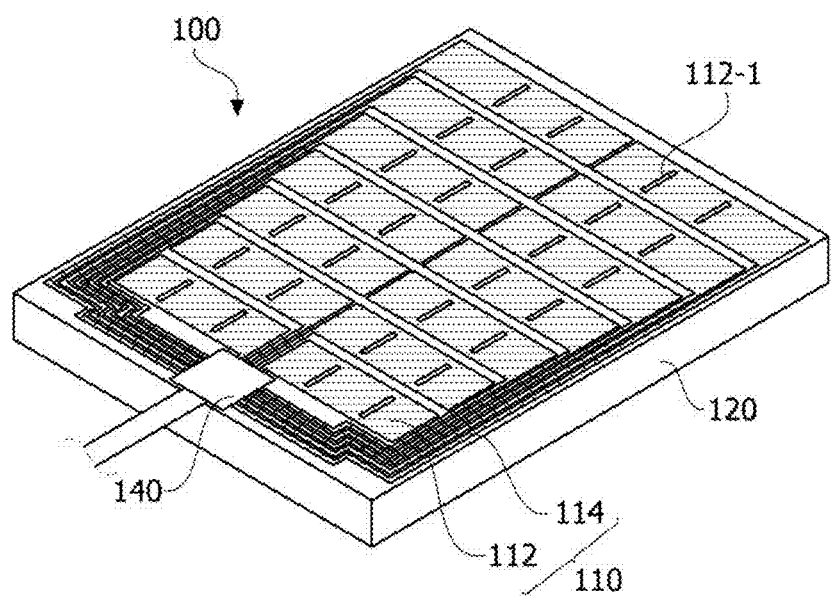
FIG. 4 is a bottom view of a pressure detecting sensor according to another embodiment of the present invention.
Figure 5:
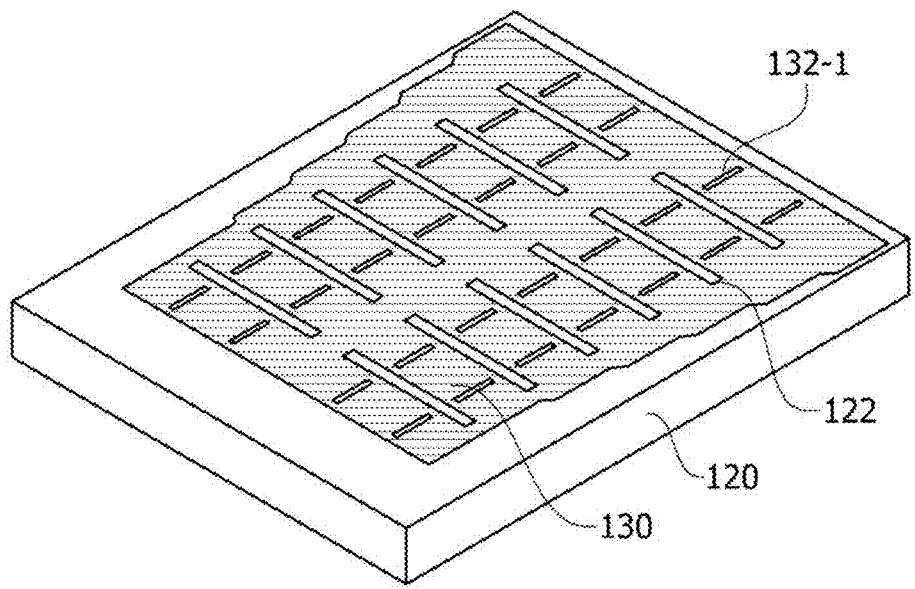
FIG. 5 is a top view of the pressure detecting sensor according to another embodiment of the present invention.

According to another embodiment of the present invention, as shown in FIGS. 4 and 5, a pattern 112-1 may be formed on each of the signal electrodes 112 of the first electrode layer 110 and a pattern 132-1 matched with the pattern formed on each of the signal electrodes 112 of the first electrode layer 110 may be further formed on the second electrode layer 130. Here, due to the pattern 112-1 formed at the first electrode layer 110, an empty space may be formed at a part of the first electrode layer 110 or the empty space may be filled with an insulating material. As described above, when the pattern 112-1 is formed on each of the signal electrodes 112 and the pattern 132-1 is also formed on the second electrode layer 130 to be matched with the pattern 112-1 formed on each of the signal electrodes 112, since it is possible to detect a subdivided variation of the capacitance, sensitivity and resolution of detecting a pressure may be further improved.

Meanwhile, according to the embodiment of the present invention, the pressure detecting sensor 100 may further include a supporting material for supporting the wiring electrodes 114 of the first electrode layer 110.

Figure 6:
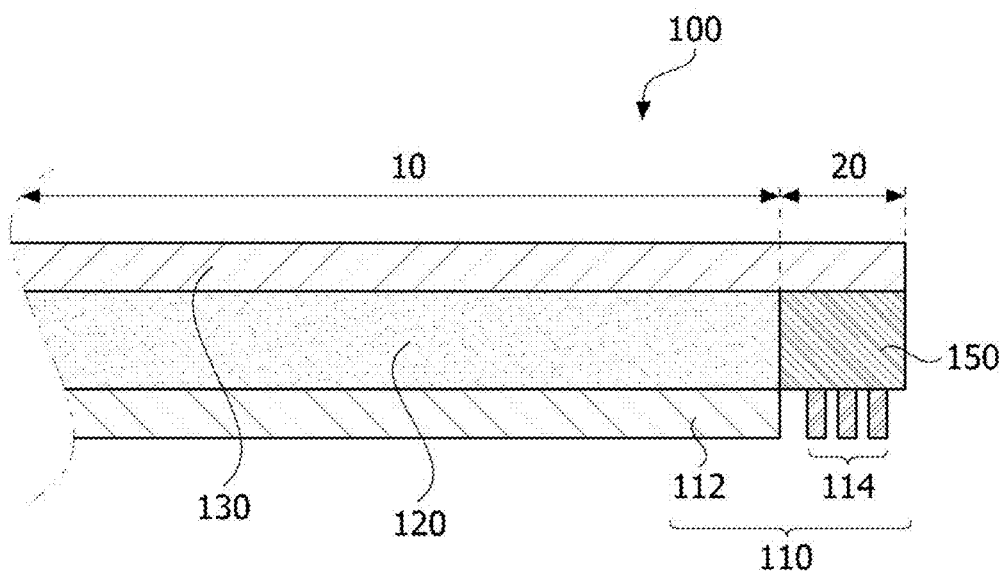
FIG. 6 is a cross-sectional view of the pressure detecting sensor according to another embodiment of the present invention.

FIG. 6 is a cross-sectional view of a pressure detecting sensor according to another embodiment of the present invention. An overlapped description of the same content as that of FIGS. 1 to 5 will be omitted.

Referring to FIG. 6, a pressure detecting sensor 100 includes a first electrode layer 110, an elastic dielectric layer 120 disposed on the first electrode layer 110, a second electrode layer 130 disposed on the elastic dielectric layer 120, a signal transmission portion 140, and a supporting material 150.

Here, the supporting material 150 may be disposed on a side surface of the elastic dielectric layer 120 above a second region 20, that is, a plurality of wiring electrodes 114 and hardness of the supporting material 150 may be greater than hardness of the elastic dielectric layer 120.

As describe above, when the supporting material 150 does not have elasticity, although a pressure is applied to a region in which the wiring electrodes 114 are arranged, that is, to the second region 20, a thickness of the supporting material 150 does not change such that capacitance does not change. Accordingly, it is possible to reduce noise caused by the wiring electrodes 114.

Figure 7:
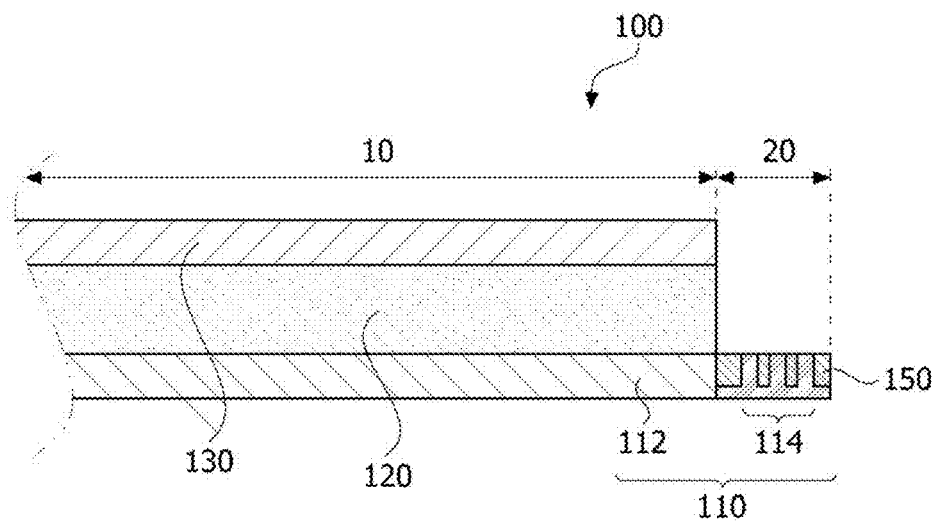
FIGS. 7 and 8 are cross-sectional views of a pressure detecting sensor according to still another embodiment of the present invention.
Figure 8:
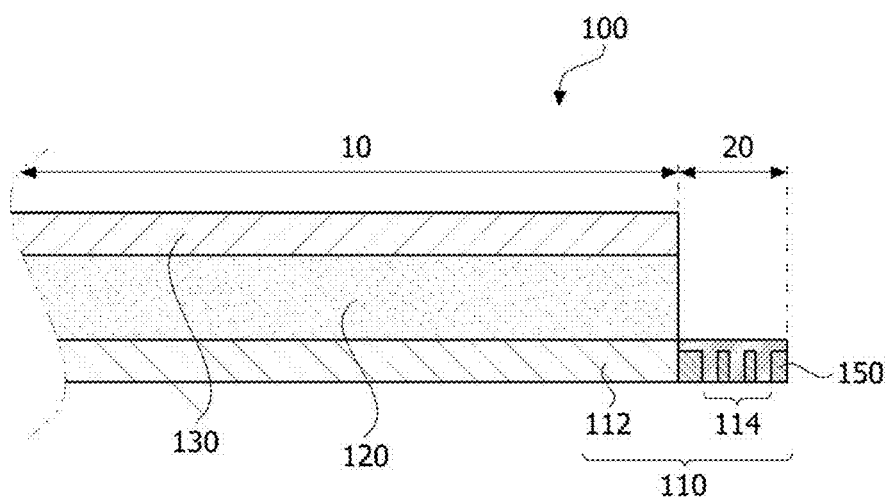

FIGS. 7 and 8 are cross-sectional views of a pressure detecting sensor according to still another embodiment of the present invention. An overlapped description of the same content as that of FIGS. 1 to 6 will be omitted.

Referring to FIGS. 7 and 8, a pressure detecting sensor 100 includes a first electrode layer 110, an elastic dielectric layer 120 disposed on the first electrode layer 110, a second electrode layer 130 disposed on the elastic dielectric layer 120, a signal transmission portion 140, and a supporting material 150.

Here, the elastic dielectric layer 120 and the second electrode layer 130 are arranged only in a first region 10. Accordingly, since the capacitance does not change even when a pressure is applied to a region in which wiring electrodes 114 are arranged, that is, a second region 20, noise caused by the wiring electrodes 114 may be fundamentally blocked.

Here, a plurality of such wiring electrodes 114 may be embedded in the supporting material 150. Here, the supporting material 150 may include an insulating material. For example, the supporting material 150 may be an insulating adhesive or an insulating tape having greater hardness than that of the wiring electrodes 114. Accordingly, the plurality of wiring electrodes 114 may have adequate strength and may be protected from an external environment.

Figure 9:
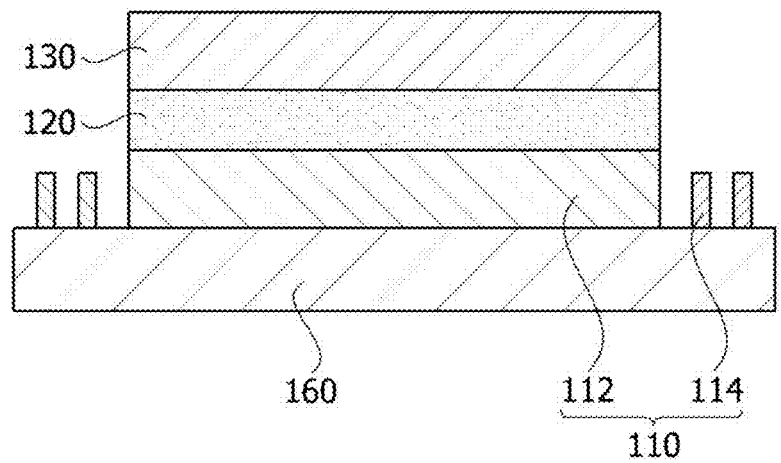
FIG. 9 is a cross-sectional view of a pressure detecting sensor according to yet another embodiment of the present invention.

FIG. 9 is a cross-sectional view of a pressure detecting sensor according to yet another embodiment of the present invention. An overlapped description of the same content as that of FIGS. 1 to 8 will be omitted.

Referring to FIG. 9, a pressure detecting sensor 100 includes a first electrode layer 110, an elastic dielectric layer 120 disposed on the first electrode layer 110, a second electrode layer 130 disposed on the elastic dielectric layer 120, a signal transmission portion 140, and an insulating layer 160.

The insulating layer 160 may be disposed below the first electrode layer 110. According to the embodiment of the present invention, while the first electrode layer 110 including a plurality of signal electrodes 112 is disposed on a bottom surface of the pressure detecting sensor 100 and the second electrode layer 130 connected to a ground is disposed on a top surface of the pressure detecting sensor 100, that is, a surface on which an object whose pressure is detected is disposed, when the insulating layer 160 is joined below the first electrode layer 110, it is possible to minimize interference among the plurality of signal electrodes 112.

Figure 10:
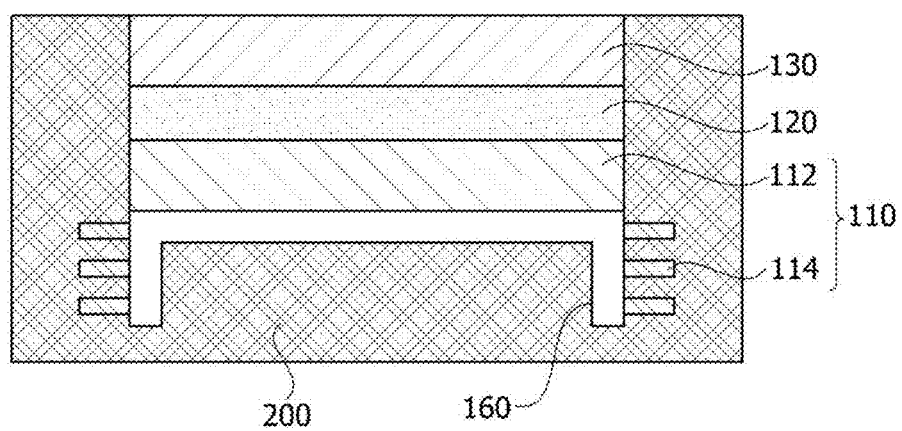
FIG. 10 is a cross-sectional view of a pressure detecting sensor according to even another embodiment of the present invention.

FIG. 10 is a cross-sectional view of a pressure detecting sensor according to even another embodiment of the present invention. An overlapped description of the same content as that of FIGS. 1 to 9 will be omitted.

Referring to FIG. 10, a pressure detecting sensor 100 includes a first electrode layer 110, an elastic dielectric layer 120 disposed on the first electrode layer 110, a second electrode layer 130 disposed on the elastic dielectric layer 120, a signal transmission portion 140, and an insulating layer 160.

Here, the first electrode layer 110 including a plurality of signal electrodes 112 and a plurality of wiring electrodes 114 is disposed on the insulating layer 160, and the plurality of signal electrodes 112 and the plurality of wiring electrodes 114 may be bent from each other. Accordingly, the plurality of wiring electrodes 114 may be arranged on sides of a surface to which a pressure is applied. Also, the pressure detecting sensor 100 may be embedded in an apparatus 200.

Accordingly, only a pressure applied to a region in which the signal electrodes 112 are arranged may be detected and noise caused by the wiring electrodes 114 may be reduced.

Table 1 shows capacitance variations of pressure detecting sensors according to Comparative Example and Embodiment. In the pressure detecting sensor according to Comparative Example, a second electrode layer 130 connected to a ground, an elastic dielectric layer 120, and a first electrode layer 110 including a plurality of signal electrodes 112 are sequentially stacked from the bottom up. In the pressure detecting sensor according to Embodiment, a first electrode layer 110 including a plurality of signal electrodes 112, an elastic dielectric layer 120, and a second electrode layer 130 connected to a ground are sequentially stacked from the bottom up. Capacitance variations in initial states, that is, states with no weight being applied thereto, states with a weight of 300 g being applied thereto, and states, in which no weight is applied and only a hand is touched, of the pressure detecting sensor according to Comparative Example and the pressure detecting sensor according to Embodiment were measured.

TABLE 1

| Experimental Examples | Initial State (0 g) | Touch of Hand | 300 g |
| --- | --- | --- | --- |
| Comparative Example | 131.2 pF | 142.2 pF | 159.1 pF |
| Embodiment | 132.3 pF | 132.8 pF | 159.8 pF |

Referring to Table 1, it may be seen that a capacitance variation when a weight of 0 g is applied and a capacitance variation when a weight of 300 g is applied are similarly shown as about 29 pF in both Comparative Example and Embodiment. However, it may be seen that when only the hand touched a top without a pressure being applied thereto, a capacitance variation in Comparative Example is shown as 11.0 pF and a capacitance variation in Embodiment is shown as 0.5 pF. As described above, according to the embodiment of the present invention, it may be seen that noise caused by a touch of a human body may be prevented.

Meanwhile, according to the embodiment of the present invention, to prevent noise caused by shaking or electromagnetic waves, a signal transmission portion may have a mesh structure.

Figure 11:
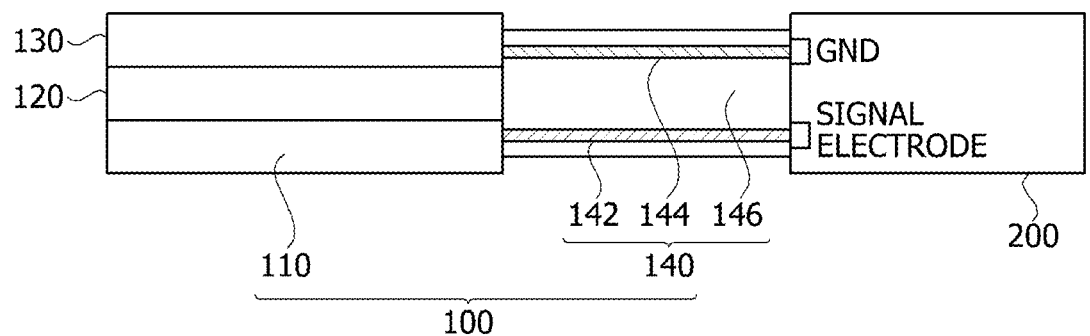
FIG. 11 is a cross-sectional view of a pressure detecting sensor according to a further embodiment of the present invention.
Figure 12:
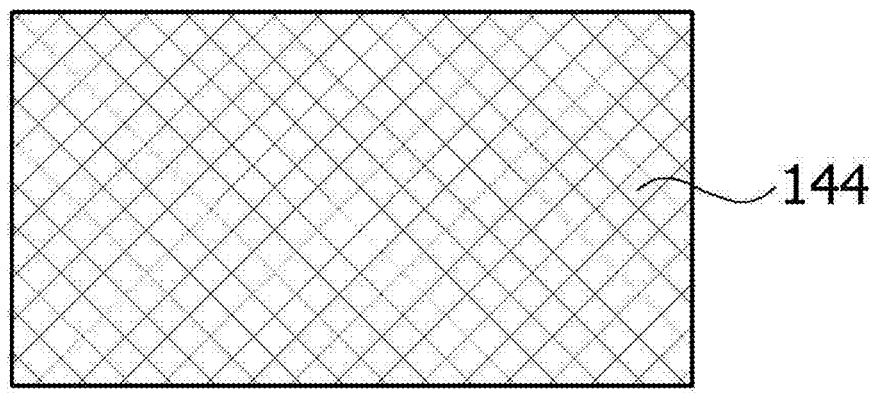
FIG. 12 illustrates an example of a mesh structure applied to a signal transmission portion of the pressure detecting sensor of FIG. 11.
Figure 13:
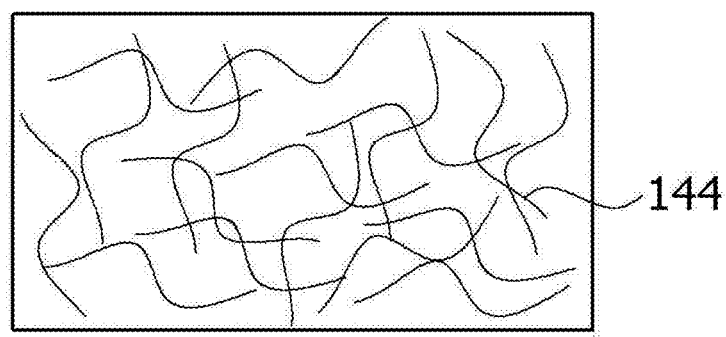
FIG. 13 illustrates another example of the mesh structure applied to the signal transmission portion of the pressure detecting sensor of FIG. 11.
Figure 14:
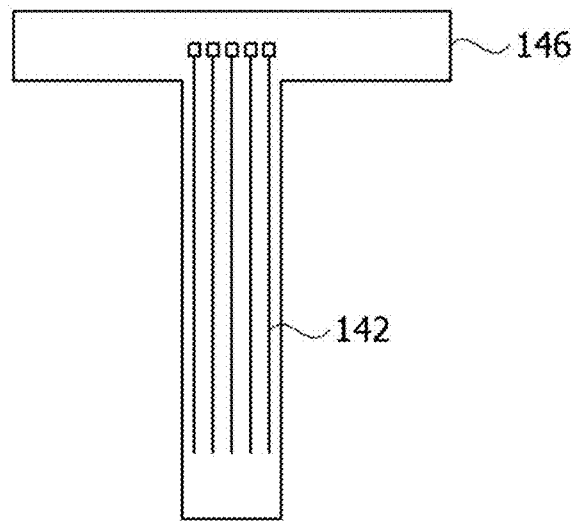
FIG. 14 is a bottom view of the signal transmission portion of the pressure detecting sensor of FIG. 11.
Figure 15:
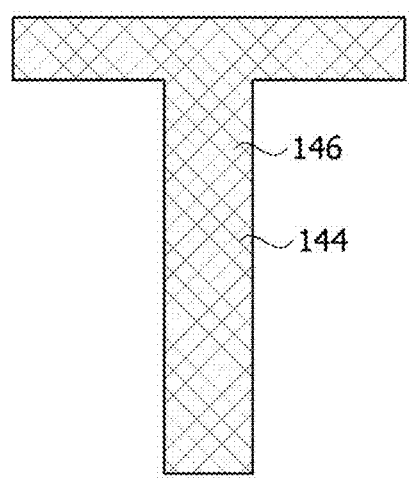
FIG. 15 is a top view of the signal transmission portion of the pressure detecting sensor of FIG. 11.

FIG. 11 is a cross-sectional view of a pressure detecting sensor according to a further embodiment of the present invention, FIG. 12 illustrates an example of a mesh structure applied to a signal transmission portion of the pressure detecting sensor of FIG. 11, and FIG. 13 illustrates another example of the mesh structure applied to the signal transmission portion of the pressure detecting sensor of FIG. 11. FIG. 14 is a bottom view of the signal transmission portion of the pressure detecting sensor of FIG. 11, and FIG. 15 is a top view of the signal transmission portion of the pressure detecting sensor of FIG. 11. An overlapped description of the same content as that of FIGS. 1 to 10 will be omitted.

Referring to FIG. 11, a pressure detecting sensor 100 includes a first electrode layer 110, an elastic dielectric layer 120 disposed on the first electrode layer 110, a second electrode layer 130 disposed on the elastic dielectric layer 120, and a signal transmission portion 140.

Here, the first electrode layer 110 includes a plurality of signal electrodes 112 and a plurality of wiring electrodes 114 connected to the plurality of signal electrodes 112.

Here, each of the wiring electrodes 114 is connected to a first metal electrode 142 of the signal transmission portion 140, and a wire withdrawn from the second electrode layer 130 is connected to a second metal electrode 144 of the signal transmission portion 140. For this, the signal transmission portion 140 includes the first metal electrode 142, the second metal electrode 144, and an insulating layer 146 disposed between the first metal electrode 142 and the second metal electrode 144. Also, an insulating layer 148 may be further disposed on the second metal electrode 144.

Here, at least one of the first metal electrode 142 and the second metal electrode 144 may have a mesh structure. The mesh structure, as shown in FIG. 12, may be a net structure including knots having a uniform size and interval. Otherwise, the mesh structure, as shown in FIG. 13, may be a net structure including knots having random shapes. In addition, the mesh structure may have a circular shape, an oblique shape, a triangular shape, a polygonal shape, and the like. Here, the mesh structure may include one or more selected from the group consisting of silver (Ag), gold (Au), copper (Cu), and aluminum (Al). The size, shape, and material of the mesh structure are not limited thereto and may vary.

According to one embodiment of the present invention, the wiring electrode 114 withdrawn from the first electrode layer 110 may be connected to the first metal electrode 142 having a wiring shape as shown in FIG. 14, and a wire withdrawn from the second electrode layer 130 may be connected to the second metal electrode 144 having the mesh structure as shown in FIG. 15. Here, the second metal electrode 144 may have a mesh structure formed overall on one of both surfaces of the signal transmission portion 140, that is, a flexible PCB (FPCB). As described above, when at least one of the first metal electrode 142 and the second metal electrode 144 has a mesh structure, not only an electrical signal generated by the first electrode layer 110 or the second electrode layer 130 may be efficiently transmitted to a signal processing portion 200 through the first metal electrode 142 or the second metal electrode 144 but also noise in pressure detection may be prevented by blocking electromagnetic waves on the pressure detecting sensor 100. Also, since the mesh structure has a bonding property with wires, the mesh structure has an advantage of being strong against shaking of the pressure detecting sensor.

Meanwhile, according to the embodiment of the present invention, the second metal electrode 144 connected to the second electrode layer 130 may be connected to a ground electrode of the signal processing portion 200 and an object whose pressure is detected, for example, a human body may be set to be disposed on the second electrode layer 130.

As described above, when the second electrode layer 130 is connected to a ground, although the human body comes into slight contact with the second electrode layer 130, a pressure is not actually applied to the second electrode layer 130 such that capacitance between the first electrode layer 110 and the second electrode layer 130 does not change. Accordingly, it is possible to prevent noise caused by a touch of the human body. Particularly, when the second metal electrode 144, which connects the wire withdrawn from the second electrode layer 130 to the ground electrode of the signal processing portion 200, has a mesh structure, since electromagnetic waves on the pressure detecting sensor 100 may be prevented, noise caused by the electromagnetic waves may be prevented.

Table 2 shows capacitance variations of pressure detecting sensors according to Comparative Example 2 and Embodiment 2. The pressure detecting sensor according to Comparative Example 2 includes a first electrode layer 110 including a plurality of signal electrodes 112, an elastic dielectric layer 120 on the first electrode layer 110, and a second electrode layer 130 on the elastic dielectric layer 120. The first electrode layer 110 is connected to a signal electrode of a signal processing portion 200 through a wire-shaped metal electrode of a signal transmission portion 140, and the second electrode layer 130 is connected to a ground electrode of the signal processing portion 200 through the wire-shaped metal electrode of the signal transmission portion 140. Also, the pressure detecting sensor according to Embodiment 2 includes a first electrode layer 110 including a plurality of signal electrodes 112, an elastic dielectric layer 120 on the first electrode layer 110, and a second electrode layer 130 on the elastic dielectric layer 120. The first electrode layer 110 is connected to a signal electrode of a signal processing portion 200 through a wire-shaped metal electrode of a signal transmission portion 140, and the second electrode layer 130 is connected to a ground electrode of the signal processing portion 200 through a mesh-structured metal electrode of the signal transmission portion 140.

TABLE 2

| Experimental Examples | Initial State (0 g) | 300 g | Variation Caused by Shake |
|---|---|---|---|
| Comparative Example 2 | 124 pF | 155 pF | 3 pF |
| Embodiment 2 | 132 pF | 165 pF | 0 pF |

Referring to Table 2, it may be seen that a capacitance variation when a weight of 0 g is applied and a capacitance variation when a weight of 300 g is applied are similarly shown as 31 pF and 33 pF, respectively, in both Comparative Example 2 and Embodiment 2. However, it may be seen that when a signal connection portion, that is, a PCB shakes, a variation in capacitance with respect to the pressure detecting sensor of Comparative Example 2 is 3 pF but a variation in capacitance with respect to the pressure detecting sensor of Embodiment 2 is 0 pF, in which a difference is present. That is, it may be seen that according to the embodiment of the present invention, in comparison to Comparative Example 2 in which all metal electrodes of the signal transmission portion are configured as wire shapes, pressure detection performance of Embodiment 2, in which one metal electrode has a mesh structure, is not low. Also, it may be seen that in comparison to Comparative Example 2 configured as joints among wires, noise caused by shaking may be prevented by a stronger combination in Embodiment 2 configured as joints among wires and mesh.

The pressure detecting sensor according to the embodiment of the present invention may be applied to a pressure detecting chair for posture correction, an occupation detecting mat, a fall preventing mat, and the like.

Figure 16:
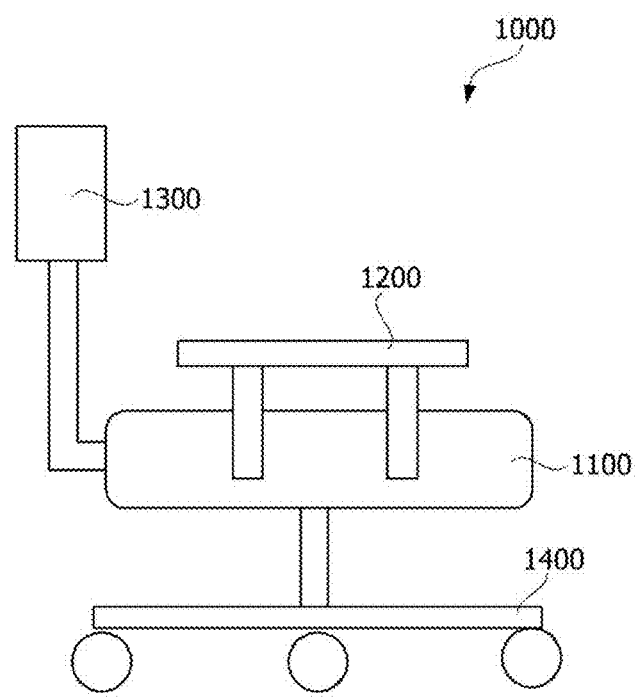
FIG. 16 is a side view of a pressure detecting chair according to one embodiment of the present invention.
Figure 17:
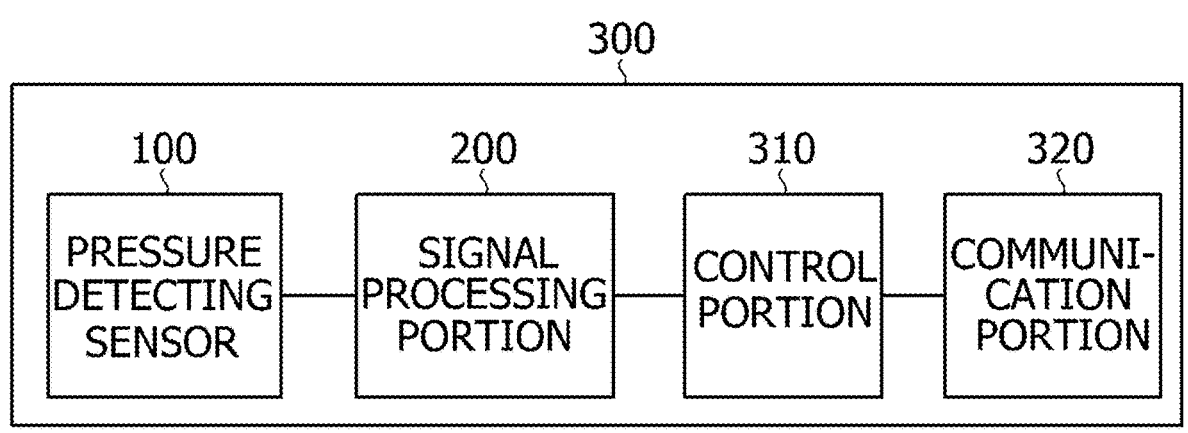
FIG. 17 is a block diagram of a pressure detecting device built in the pressure detecting chair according to one embodiment of the present invention.

FIG. 16 is a side view of a pressure detecting chair according to one embodiment of the present invention, and FIG. 17 is a block diagram of a pressure detecting device built in the pressure detecting chair according to one embodiment of the present invention.

Referring to FIGS. 16 and 17, a pressure detecting chair 1000 may include a seat 1100, an armrest 1200, a back 1300, a leg 1400, and the like. When a human is seated on the seat 1100, a pressure detecting device 300 built-in the pressure detecting chair 1000 may detect whether the human is seated and may measure a relative pressure distribution according to being seated. The pressure detecting device 300 may detect a weight, an age group, a sitting posture, and the like according to the measured pressure distribution.

The pressure detecting device 300 may include a pressure detecting sensor 100, a signal processing portion 310, a control portion 320, and a communication portion 330. The pressure detecting sensor 100 may detect whether the human is seated on the seat 1100, the relative pressure distribution according to being seated, and the like.

According to the embodiment of the present invention, the pressure detecting sensor 100 may be disposed in the seat 1100. Also, the signal processing portion 310 may be connected to the pressure detecting sensor 100 and may process an electrical signal generated by the pressure detecting sensor 100. Also, the control portion 320 may be connected to the signal processing portion 310 and may generate a control signal on the basis of a signal processed by the signal processing portion 310. As an example, the control portion 320 may control turning-on-or-off of the pressure detecting device 300 by using a result of processing the signal detected by the pressure detecting sensor 100. As another example, the control portion 320 may generate diagnosis information related to a posture of one who is seated by using the result of processing the signal detected by the pressure detecting sensor 100. As still another example, the control portion 320 may generate an alarm signal and the like for correcting a posture of one who is seated by using the result of processing the signal detected by the pressure detecting sensor 100.

Also, the communication portion 330 transmits the control signal generated by the control portion 320 to the outside.

Although exemplary embodiments of the present disclosure have been described above, it should be understood by one of ordinary skill in the art that a variety of modifications and a variety of changes may be made without departing from the concept and scope of the present disclosure which are defined in the following claims.

The invention claimed is:

1. A pressure detecting sensor comprising:
   a first electrode layer which is formed of conductive fibers and comprises a plurality of signal electrodes arranged in a first region, and a plurality of wiring electrodes arranged in a second region and connected to the plurality of signal electrodes;
   an elastic dielectric layer disposed in the first region;
   a second electrode layer disposed on the elastic dielectric layer and formed of conductive fibers; and
   an insulating layer disposed below the first electrode layer.

2. The pressure detecting sensor of claim 1, further comprising a supporting material disposed in the second region.

3. The pressure detecting sensor of claim 2, wherein the supporting material is disposed on a side surface of the elastic dielectric layer above the plurality of wiring electrodes, and
   wherein hardness of the supporting material is greater than hardness of the elastic dielectric layer.

4. The pressure detecting sensor of claim 2, wherein the plurality of wiring electrodes are embedded in the supporting material.

5. The pressure detecting sensor of claim 1, wherein the plurality of signal electrodes and the plurality of wiring electrodes are bent from each other.

6. The pressure detecting sensor of claim 1, wherein the second electrode layer is connected to a ground.

7. The pressure detecting sensor of claim 6, wherein patterns matched with an alignment of the plurality of signal electrodes are formed on the second electrode layer.

8. The pressure detecting sensor of claim 7, wherein the second electrode layer is formed to be not separated by the patterns.

9. The pressure detecting sensor of claim 1, further comprising a signal transmission portion connected to the first electrode layer and the second electrode layer,
wherein the signal transmission portion comprises:
a first metal electrode connected to the first electrode layer;
a second metal electrode connected to the second electrode layer; and
an insulating layer disposed between the first metal electrode and the second metal electrode, and
wherein at least one of the first metal electrode and the second metal electrode has a mesh structure.

10. The pressure detecting sensor of claim 9, wherein the first electrode layer comprises the plurality of signal electrodes spaced at certain intervals apart,
wherein the second electrode layer is connected to a ground, and
wherein the second metal electrode has a mesh structure.

11. The pressure detecting sensor of claim 10, wherein the second metal electrode comprises copper.

12. The pressure detecting sensor of claim 9, wherein the signal transmission portion comprises a flexible printed circuit board (FPCB).

13. The pressure detecting sensor of claim 12, wherein the mesh structure is formed overall on one of both surfaces of the FPCB.

14. A pressure detecting device comprising:
a pressure detecting sensor;
a signal processing portion connected to the pressure detecting sensor and configured to process an electrical signal generated by the pressure detecting sensor; and
a control portion connected to the signal processing portion and configured to generate a control signal on the basis of the signal processed by the signal processing portion,
wherein the pressure detecting sensor comprises:
a first electrode layer which is formed of conductive fibers and comprises a plurality of signal electrodes arranged in a first region and a plurality of wiring electrodes arranged in a second region and connected to the plurality of signal electrodes;
an elastic dielectric layer disposed in the first region;
a second electrode layer disposed on the elastic dielectric layer and formed of conductive fibers; and
an insulating layer disposed below the first electrode layer.

* * * * *